(12) United States Patent
Milner

(10) Patent No.: US 8,234,425 B1
(45) Date of Patent: Jul. 31, 2012

(54) ARBITER MODULE

(75) Inventor: Simon Milner, Palo Alto, CA (US)

(73) Assignee: Marvell International Ltd., Hamilton (BM)

( * ) Notice: Subject to any disclaimer, the term of this patent is extended or adjusted under 35 U.S.C. 154(b) by 446 days.

(21) Appl. No.: 12/163,801

(22) Filed: Jun. 27, 2008

Related U.S. Application Data

(60) Provisional application No. 60/946,508, filed on Jun. 27, 2007.

(51) Int. Cl.
*G06F 13/12* (2006.01)

(52) U.S. Cl. .......................................... 710/62

(58) Field of Classification Search ................ 710/62
See application file for complete search history.

(56) References Cited

U.S. PATENT DOCUMENTS

| | | | |
|---|---|---|---|
| 4,611,299 A | 9/1986 | Hori et al. |
| 4,823,340 A | 4/1989 | Grassman et al. |
| 5,260,905 A | 11/1993 | Mori |
| 5,307,343 A | 4/1994 | Bostica et al. |
| 5,440,523 A | 8/1995 | Joffe |
| 5,680,595 A | 10/1997 | Thomann et al. |
| 5,719,890 A | 2/1998 | Thomman et al. |
| 5,778,007 A | 7/1998 | Thomann et al. |
| 5,802,131 A | 9/1998 | Morzano |
| 5,815,447 A | 9/1998 | Thomann |
| 5,875,470 A | 2/1999 | Dreibelbis et al. |
| 5,953,340 A | 9/1999 | Scott et al. |
| 5,996,051 A | 11/1999 | Mergard |
| 6,021,086 A | 2/2000 | Joffe et al. |
| 6,034,957 A | 3/2000 | Haddock et al. |
| 6,067,301 A | 5/2000 | Aatresh |
| 6,081,528 A | 6/2000 | Thomann |
| 6,115,389 A | 9/2000 | Mahale et al. |
| 6,160,814 A | 12/2000 | Ren et al. |
| 6,167,491 A | 12/2000 | McAlpine |
| 6,216,205 B1 | 4/2001 | Chin et al. |
| 6,230,191 B1 | 5/2001 | Walker |
| 6,370,624 B1 | 4/2002 | Ajanovic et al. |
| 6,446,173 B1 | 9/2002 | Pham |
| 6,487,207 B1 | 11/2002 | Thomann |
| 6,535,939 B1 | 3/2003 | Arimilli et al. |
| 6,535,963 B1 | 3/2003 | Rivers |
| 6,539,488 B1 | 3/2003 | Tota et al. |
| 6,618,390 B1 | 9/2003 | Erimli et al. |

(Continued)

FOREIGN PATENT DOCUMENTS

FR     2779843     12/1999

(Continued)

OTHER PUBLICATIONS

Pallampati, Amarnath "iSCSI Performance Over RDMA-Enabled Network", *Thesis, Department of Electrical and Computer Engineering, Graduate School of Wichita State University*, (Jul. 2006), 58 pages.

(Continued)

*Primary Examiner* — Henry Tsai
*Assistant Examiner* — Juanito Borromeo

(57) ABSTRACT

An arbiter module is described. In one or more implementations, an apparatus comprises a plurality of interfaces to provide a communicative coupling between a central processing unit, a media drive and a network. The apparatus further comprises one or more modules to manage data routing between each of the plurality of interfaces such that the data is routable between the media drive and the network independent of the central processing unit.

25 Claims, 8 Drawing Sheets

U.S. PATENT DOCUMENTS

| | | | |
|---|---|---|---|
| 6,712,704 B2* | 3/2004 | Eliott | 463/43 |
| 6,714,643 B1 | 3/2004 | Gargeya et al. | |
| 6,732,184 B1 | 5/2004 | Merchant et al. | |
| 6,741,589 B1 | 5/2004 | Sang et al. | |
| 6,785,272 B1 | 8/2004 | Sugihara | |
| 7,039,781 B2 | 5/2006 | Iwata et al. | |
| 7,068,651 B2 | 6/2006 | Schmidt et al. | |
| 7,099,325 B1 | 8/2006 | Kaniz et al. | |
| 7,130,308 B2 | 10/2006 | Haddock et al. | |
| 7,136,953 B1 | 11/2006 | Bisson et al. | |
| 7,149,834 B2 | 12/2006 | Peters et al. | |
| 7,185,132 B2 | 2/2007 | Tang | |
| 7,197,591 B2 | 3/2007 | Kwa et al. | |
| 7,249,270 B2* | 7/2007 | Mansell et al. | 713/320 |
| 7,329,136 B2 | 2/2008 | Su et al. | |
| 7,334,072 B1 | 2/2008 | Wright | |
| 7,359,997 B2 | 4/2008 | Ishida et al. | |
| 7,447,824 B2 | 11/2008 | Jabori et al. | |
| 7,451,280 B2 | 11/2008 | Furtek et al. | |
| 7,469,311 B1 | 12/2008 | Tsu et al. | |
| 7,478,188 B2 | 1/2009 | Patton | |
| 7,480,757 B2 | 1/2009 | Atherton et al. | |
| 7,480,808 B2 | 1/2009 | Caruk et al. | |
| 7,496,707 B2 | 2/2009 | Freking et al. | |
| 7,536,490 B2 | 5/2009 | Mao | |
| 7,539,809 B2 | 5/2009 | Juenger | |
| 7,571,287 B2 | 8/2009 | Lee et al. | |
| 7,583,600 B1 | 9/2009 | Schanke et al. | |
| 7,606,960 B2 | 10/2009 | Munguia | |
| 7,624,221 B1 | 11/2009 | Case | |
| 7,660,925 B2 | 2/2010 | Larson et al. | |
| 7,685,322 B2 | 3/2010 | Bhesania et al. | |
| 7,689,753 B2 | 3/2010 | Kwak et al. | |
| 7,752,342 B2 | 7/2010 | Tee et al. | |
| 7,949,817 B1 | 5/2011 | Sakarda | |
| 8,205,028 B1 | 6/2012 | Sakarda | |
| 2001/0036116 A1 | 11/2001 | Kubo et al. | |
| 2003/0154314 A1* | 8/2003 | Mason et al. | 709/250 |
| 2004/0093389 A1* | 5/2004 | Mohamed et al. | 709/212 |
| 2004/0193774 A1 | 9/2004 | Iwata et al. | |
| 2005/0268001 A1* | 12/2005 | Kimelman et al. | 710/15 |
| 2006/0075144 A1* | 4/2006 | Challener et al. | 709/250 |
| 2006/0106962 A1 | 5/2006 | Woodbridge et al. | |
| 2008/0215773 A1 | 9/2008 | Christison et al. | |
| 2008/0215774 A1 | 9/2008 | Kim et al. | |
| 2008/0320189 A1 | 12/2008 | Arssov | |

FOREIGN PATENT DOCUMENTS

| | | |
|---|---|---|
| JP | 1162294 | 6/1989 |
| JP | 4061094 | 2/1992 |
| JP | 5047174 | 2/1993 |
| JP | 10506776 | 6/1998 |
| JP | 2004288355 | 10/2004 |

OTHER PUBLICATIONS

"6-Port Fast Ethernet Switch, 88E6060 (Product Overview)", *Link Street*;www.marvell.com; Marvell Semiconductor, Inc.; Sunnyvale, CA, (2002), 2 pgs.

"7-Port Fast Ethernet Switch with 802.1 Q, 88E6063 (Product Overview)", www.marvell.com; Marvell Semiconductor, Inc.; Sunnyvale, CA, (2002), 2 pgs.

"Advisory Action", U.S. Appl. No. 10/702,744, (Sep. 11, 2007), 3 pages.

"European Communication and Search Report", Application No. EP04006012; European Patent Office; Munich, Germany, (May 30, 2005), 4 pgs.

"European Search Report", Application No. EP04006012; Munich, Germany, (May 30, 2005), 4 pages.

"Final Office Action", U.S. Appl. No. 10/702,744, (Jun. 25, 2007), 13 pages.

"Final Office Action", U.S. Appl. No. 12/182,014, (Oct. 29, 2010), 16 pages.

"Final Office Action", U.S. Appl. No. 12/434,000, (Apr. 26, 2011), 15 pages.

"Final Office Action", U.S. Appl. No. 12/494,076, (Mar. 30, 2011), 13 pages.

"Final Office Action", U.S. Appl. No. 12/494,076, (Oct. 3, 2011), 13 pages.

"Foreign Office Action", Japanese Application No. 2004-071574, (Feb. 19, 2008), 4 pages.

"Foreign Office Action", Japanese Application No. 2008-270813, (May 26, 2011), 4 pages.

"Information Technology—Telecommunications and Information Exchange Between Systems—Local and Metropolitan Area Networks—Specific Requirements", *IEEE*, Wireless LAN Medium Access Control (MAC) and Physical Layer (PHY) Specifications,(Aug. 20, 1999), 531 pages.

"Link Street 88E6063 7-Port Fast Ethernet Switch with QoS, 802.1Q VLAN, and Virtual Cable Tester (VCT) Technology", *Marvell: News*; www.marvell.com; Marvell Semiconductor, Inc.; Sunnyvale, CA, (Jul. 14, 2003), 1 page.

"Link Street 88E6181 8-Port Gigabit Ethernet Switch with Four-Level QoS", *Marvell: News*; www.marvell.com; Marvell Semiconductor, Inc.; Sunnyvale, CA, (Jul. 14, 2003),1 page.

"Link Street, Integrated Gateway Router with Multi-Port QoS Switch 88E6218 (Product Overview)", *Gateway Solutions*; www.marvell.com; Marvell Semiconductor, Inc.; Sunnyvale, CA, (2003),2 pgs.

"Link Street, Integrated Gateway Router with Multi-Port Switch, 88E6208 (Product Overview)", *Gateway Solutions*; www.marvell.com; Marvell Semiconductor, Inc.; Sunnyvale, CA, (2003),2 pgs.

"Marvell Link Street Gigabit Ethernet Switches Enable the Rapid Deployment of Gigabit Connectivity for the SOHO Market", *Marvell: Press and Investor News*; Marvell Semiconductor, Inc.; Sunnyvale, CA; http://www.marvell.com/press/pressNewsDisplay.do?releaseID=347, (Apr. 29, 2003),2 pgs.

"Method and Circuit for Transferring Data with Dynamic Parity Generation and Checking Scheme in Multi-port DRAM", *esp@cenet*; Publication No. JP10506776T (Abstract of Corresponding Document No. US5778007); *esp@cenet Database—Worldwide*; http://v3.espacenet.com/textdoc?DB=EPODOC &IDX=JP10506776T&F=0, (Jun. 30, 1998),5 pages.

"Multiport Component Memory Series and Application with a Computer", *Automated Translation; Europaisches Patentamt*, European Patent Office, Office Europeen Des Brevets; Description of FR2779843; World Lingo Language Translation Services; www.worldlingo.com, (Nov. 19, 2007),15 pgs.

"Non-Final Office Action", U.S. Appl. No. 12/182,014, (Jun. 1, 2010),13 pages.

"Non-Final Office Action", U.S. Appl. No. 10/702,744, (Feb. 19, 2009),5 pages.

"Non-Final Office Action", U.S. Appl. No. 10/702,744, (Dec. 27, 2006),10 pages.

"Non-Final Office Action", U.S. Appl. No. 12/434,000, (Nov. 10, 2010),9 pages.

"Non-Final Office Action", U.S. Appl. No. 12/436,577, (Sep. 29, 2010),6 pages.

"Non-Final Office Action", U.S. Appl. No. 12/494,076, (Dec. 22, 2010),12 pages.

"Non-Final Office Action", U.S. Appl. No. 13/092,734, (Aug. 24, 2011),15 pages.

"Notice of Allowance", U.S. Appl. No. 10/702,744, (Mar. 27, 2009),7 pages.

"Notice of Allowance", U.S. Appl. No. 12/182,014, (Jan. 20, 2011),6 pages.

"Notice of Allowance", U.S. Appl. No. 12/436,577, (Apr. 14, 2011),4 pages.

"Partial European Search Report", Application No. EP04006012; European Patent Office, Munich, Germany, (Mar. 14, 2005),2 pgs.

"Restriction Requirement", U.S. Appl. No. 10/702,744, (Jun. 30, 2006),5 pages.

Litaize, Daniel et al., "Serial Multi Port Memory Component Comprising RAM Memory Bank Assemblies for Use in Computer", Abstract of FR2779843; Publication No. FR2779843; esp@cenet database; http://v3.espace.com/textdoc?DB=EPODOC &IDX=FR2779843&F=0, (Dec. 12, 1999),1 page.

Mori, Toshiki "Multiport Memory", English Abstract of Japanese Patent Publication No. JP5047174; esp@cenet database—Worldwide, (Feb. 26, 1993),1 page.

Prince, Betty "High Performance Memories, New Architectures DRAMs and SRAMs—Evolution and Function", John Wiley & Sons, Ltd.; West Sussex, England, (1996),pp. 58-61.

"Final Office Action", U.S. Appl. No. 13/092,734, (Dec. 29, 2011),6 pages.

"Notice of Allowance", U.S. Appl. No. 13/092,734, (Feb. 23, 2012), 4 pages.

"Foreign Office Action", Japanese Application No. 2008-270813, (Apr. 3, 2012), 6 pages.

"Non-Final Office Action", U.S. Appl. No. 12/434,000, (May 4, 2012), 15 pages.

* cited by examiner

ARBITER MODULE

RELATED APPLICATION

This application claims priority under 35 U.S.C. §119(e) to U.S. Provisional Application Ser. No. 60/946,508, filed on Jun. 27, 2007, the entire disclosure of which is hereby incorporated by reference.

TECHNICAL FIELD

The subject matter of this patent application relates to arbitration of data.

BACKGROUND

Computers may include a variety of different types of devices, which may be used to provide the core functionality of the computer as well as to expand the functionality available from the computer. For example, the computer may include a processor and memory that are operable to execute instructions, such as an operating system, productivity application, and so on. The computer may also include additional devices to expand on this functionality, such as one or more input devices, display devices, and a variety of peripheral devices, such as printers, scanners, additional hard disk drives, and so on. However, each of these devices may consume a significant amount of power when placed in an active mode (e.g., ready to provide corresponding functionality), even when the device is not being used.

SUMMARY

An arbiter module is described. In one or more implementations, an apparatus comprises a plurality of interfaces to provide a communicative coupling between a central processing unit, a media drive and a network. The apparatus further comprises one or more modules to manage data routing between each of the plurality of interfaces such that the data is routable between the media drive and the network independent of the central processing unit.

In one or more implementations, an arbiter module detects that a stream of data is to be routed between a network and a media drive without being routed through a central processing unit. An indication indicates that the central processing unit is permitted to sleep and at least a portion of the stream of data is routed between the network and the media drive.

In one or more implementations, a system comprises a central processing unit and means for managing routing of data between each of a plurality of interfaces such that the data is routable between a media drive connected to one of the plurality of interfaces and a network connected to another one of the plurality of interfaces while the central processing unit is asleep.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Traditional computers, such as desktop personal computers, laptop computers, mobile computers (e.g., mobile phones and personal digital assistants), game consoles, set-top boxes, and so on employed a central processing unit (CPU) architecture in which the CPU was involved in transferring data between a media drive and a network. Downloading a file from a network to be stored on a hard disk drive using this traditional CPU architecture, for instance, kept the CPU active for the entire download process even though the CPU may not be involved for significant portions of the process. Likewise, uploading a file from the hard disk drive to the network resulted in similar involvement by the CPU. Therefore, a significant amount of power may be consumed in these traditional CPU architectures by keeping the CPU (and other devices) in an active state in that the CPU is ready to perform operations but is not actively doing so.

An arbiter module is described. In an implementation, an arbiter module arbitrates communication between a network interface, a media drive interface, and a CPU. Additionally, communication may be performed by the arbiter module between the media drive interface and the network interface independently of the CPU. Thus, the CPU and other devices that are not actively involved in the communication between the media drive in the network may be put to sleep, thereby conserving power and complying with "green" considerations in mobile and non-mobile devices.

The arbiter module may be configured in a variety of ways. In an implementation, the arbiter module is configured with a processor to execute software. The software may be utilized to provide a variety of functionality in addition to the power consumption functionality previously described, such as to provide security for a computer that employs the arbiter module. For example, the software may include virus scan functionality such that data received via a network is scanned by the arbiter module before receipt by the CPU. Thus, the arbiter module may detect a virus before receipt by the CPU and/or the rest of the computer, e.g., the media drive, memory, and so on. A variety of other examples are also contemplated, further discussion of which may be found in relation to the following discussion.

In the discussion that follows, example operating environments are described that may incorporate arbiter module techniques. Example procedures are also described that may be employed in the example operating environments, as well as other environments. Thus, in instances in the discussion of the example procedures, reference will be made to the example environments by way of example. Accordingly, implementation of the example procedures is not limited to the example environments.

Operating Environment

Figure 1:
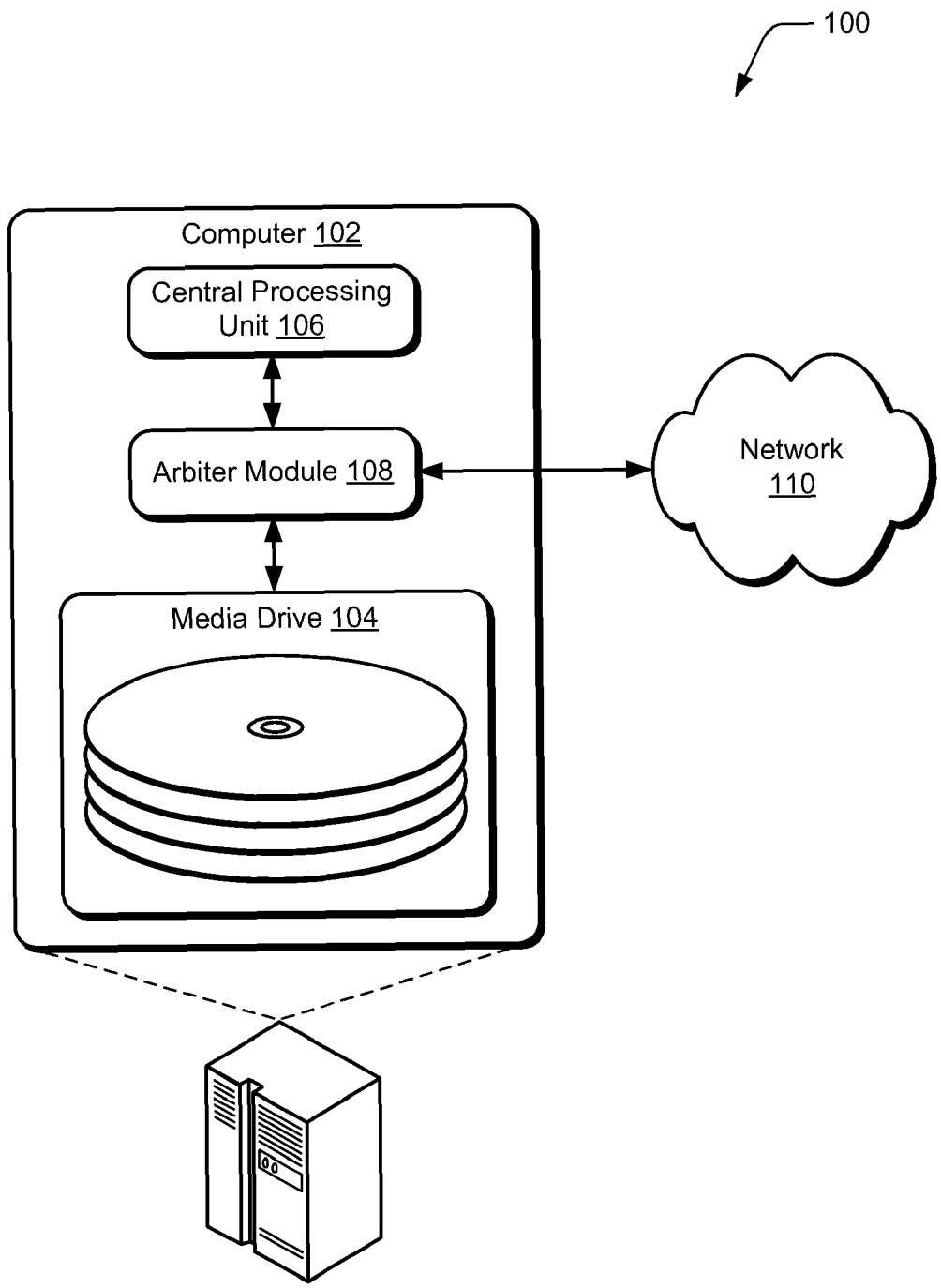
FIG. 1 is an illustration of an example operating environment that is configured to employ one or more arbitration techniques.

FIG. 1 illustrates an example operating environment 100 that is configured to employ one or more arbiter module techniques. The illustrated operating environment 100 includes a computer 102 having a media drive 104, a central processing unit (CPU) 106 and an arbiter module 108. The arbiter module 108 is illustrated as providing a communicative coupling between the media drive 104, the central processing unit 106, and a network 110.

The computer 102 may be configured in a variety of ways. For example, the computer 102 may be configured as a computing device that is capable of communicating over the network 110, such as a desktop computer, a mobile station, an entertainment appliance, a set-top box communicatively coupled to a display device, a wireless phone, a game console, and so forth. Thus, the computer 102 may range from a full resource device with substantial memory, processor and power resources (e.g., personal computers, game consoles) to a low-resource device with limited memory, processing and/or power resources (e.g., wireless phones and personal digital assistants that use a battery).

The media drive 104 is illustrated as having media that is computer readable and/or computer writeable to store data. Accordingly, the media drive 104 may also assume a wide variety of configurations, such as a hard disk drive, a writeable and/or re-writeable optical disc drive, a removable-memory device, a flash drive (e.g., a "thumb" drive), and so on.

The CPU 106 may represent one or more CPUs, which are not limited by the materials from which they are formed or the processing mechanisms employed therein. For example, CPU 106 may be comprised of semiconductor(s) and/or transistors (e.g., electronic integrated circuits (ICs)). In such a context, processor-executable instructions may be electronically-executable instructions. Alternatively, the mechanisms of or for CPUs to perform processing, and thus of or for the computer 102, may include, but are not limited to, quantum computing, optical computing, mechanical computing (e.g., using nanotechnology), and so forth.

The arbiter module 108 is illustrated as being communicatively coupled to the media drive 104, the CPU 106, and the network 110. Additionally, the arbiter module 108 is illustrated as "between" the central processing unit 106 and the media drive 104 as well as between the CPU 106 and the network 110. Thus, as illustrated in FIG. 1, data that is to be communicated from the network 110 to the CPU 106 is first passed through the arbiter module 108 and vice versa. Likewise, data to be communicated from the media drive 104 to the CPU 106 is first passed through the arbiter module 108 and vice versa.

In an implementation, the arbiter module 108 is representative of functionality of the computer 102 to route data between the network 110 and the media drive 104 independently of the CPU 106. As previously described, traditional CPU architectures were configured such that the CPU was involved (even minimally) in the routing of data between a media drive and a network. However, minimal involvement involved keeping the CPU in an active state under traditional CPU architectures. Thus, the CPU actively consumed power even when not in use.

In the illustrated implementation, however, data may be communicated between the media drive 104 and the network 110 by the arbiter module 108 independently of the CPU 106. The separation of the data communication between a media drive 104 and the network 110 from the CPU 106 (and other devices that may be connected to the CPU 106) may be used to support a variety of different functionality, further discussion of which may be found in relation to the following figure.

Figure 2:
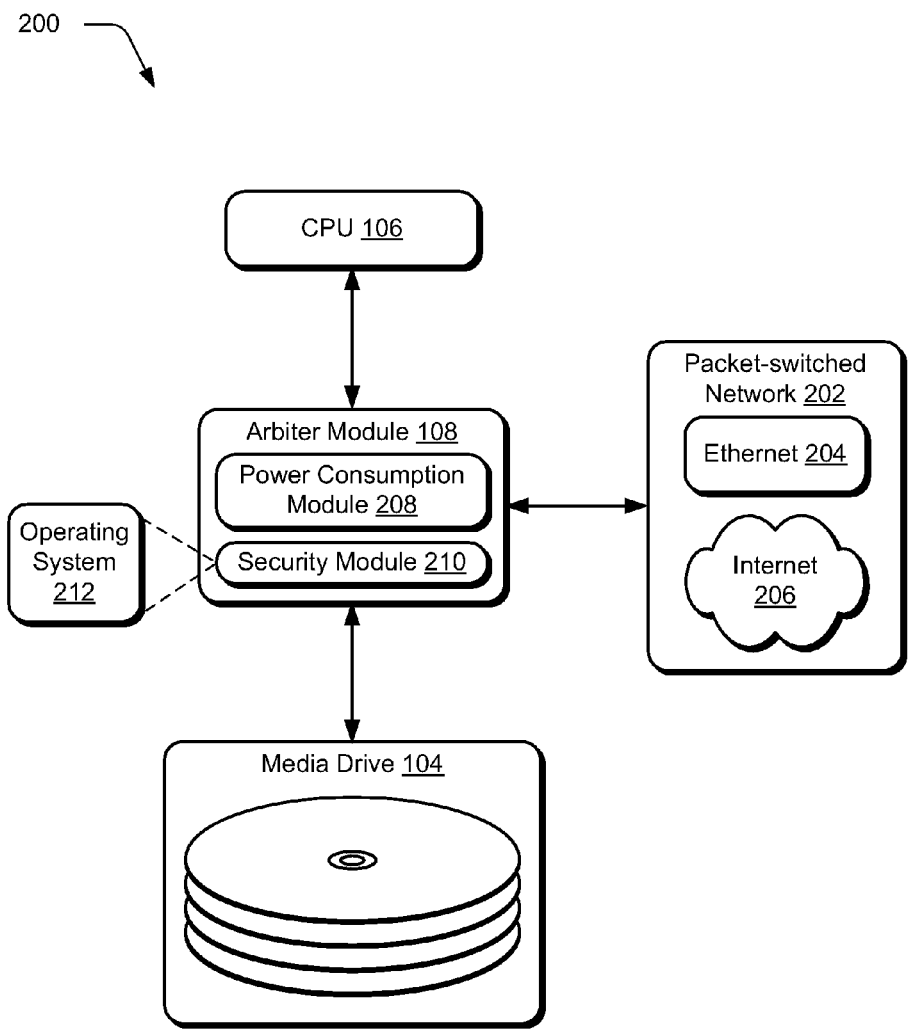
FIG. 2 is an illustration of a system in an example implementation in which an arbiter module of FIG. 1 is shown in greater detail.

FIG. 2 depicts a system 200 in an example implementation in which the arbiter module 108 of FIG. 1 is shown in greater detail. The arbiter module 108 is illustrated as being communicatively coupled to a packet-switched network 202. Packet-switched network 202 may or may not correspond to the network 110 of FIG. 1 and therefore implementation of network 110 is not limited to a packet-switched network 202 as shown in FIG. 2. The packet-switched network 202 may assume a variety of configurations, such as an Ethernet network 204 and the Internet 206 as illustrated, and may be implemented using wired or wireless techniques.

The arbiter module 108 of FIG. 2 is illustrated as including a power consumption module 208 and a security module 210. The power consumption module 208 is representative of functionality of the arbiter module 108 to manage power consumption of the computer 102 of FIG. 1. As previously described in relation to FIG. 1, the arbiter module 108 may be configured to route data between the media drive 104 in the packet-switched network 202 independently of the CPU 106. Accordingly, the power consumption module 208 may cause the CPU 106 (and other devices under control of the CPU 106) to go to "sleep" such that a state of software being executed on the CPU 106 is retained (e.g., stored in memory) yet the CPU 106 (and corresponding memory) consumes significantly less power when compared with an active state, e.g., configured to execute instructions. In this way, the arbiter module 108 (through use of the power consumption module 208) may continue to route data between the media drive 104 in the packet-switched network 202 while the CPU 106 is asleep.

In an implementation, the arbiter module 108 is configured to consume at least an order of magnitude less power than the CPU 106. In an example, the CPU 106 when in an active state consumes approximately 20 watts (W) of power as opposed to the arbiter module 108 that consumes approximately 0.5 watts of power. Thus, power is conserved by the computer 102 of FIG. 1 by placing the CPU 106 in the sleep state. It should be readily apparent, however, that a variety of other examples of power conservation are also contemplated, such as to put additional devices (e.g., a "Northbridge" and/or a "Southbridge" in a sleep state, further discussion of which may be found in relation to FIG. 3).

The arbiter module 108 is further illustrated as including a security module 210. The security module 210 is representative of functionality of the arbiter module 108 to protect the CPU 106 from virus attacks. For example, the security module 210 is illustrated in FIG. 2 as including an operating system 212. The operating system 212 may employ software that is configured to scan data managed by the arbiter module 108 for viruses, e.g., to scan data transferred from the packet-switched network 202 to the CPU 106, from the media drive 104 to the CPU 106, from the packet-switched network 202 to the media drive 104, and so on.

Thus, the arbiter module 108 (and more particularly the security module 210) may identify viruses before being communicated to the CPU 106, the media drive 104, and so on. When a virus is identified, the security module 210 may take a variety of different actions, such as to terminate communication of data from the packet-switched network 202, delete a compromised file from the media drive 104, and so on. Thus, the arbiter module may create a "demilitarized zone" (DMZ) between itself and the CPU 106. Although the arbiter module 108 is described in FIG. 2 as having a power consumption module 208 and a security module 210 that are representative of functionality that may be employed by the arbiter module 108, it should be readily apparent that a wide variety of other functionality may also be provided by the arbiter module 108 as a result of independent operation from the CPU 106.

Figure 3:
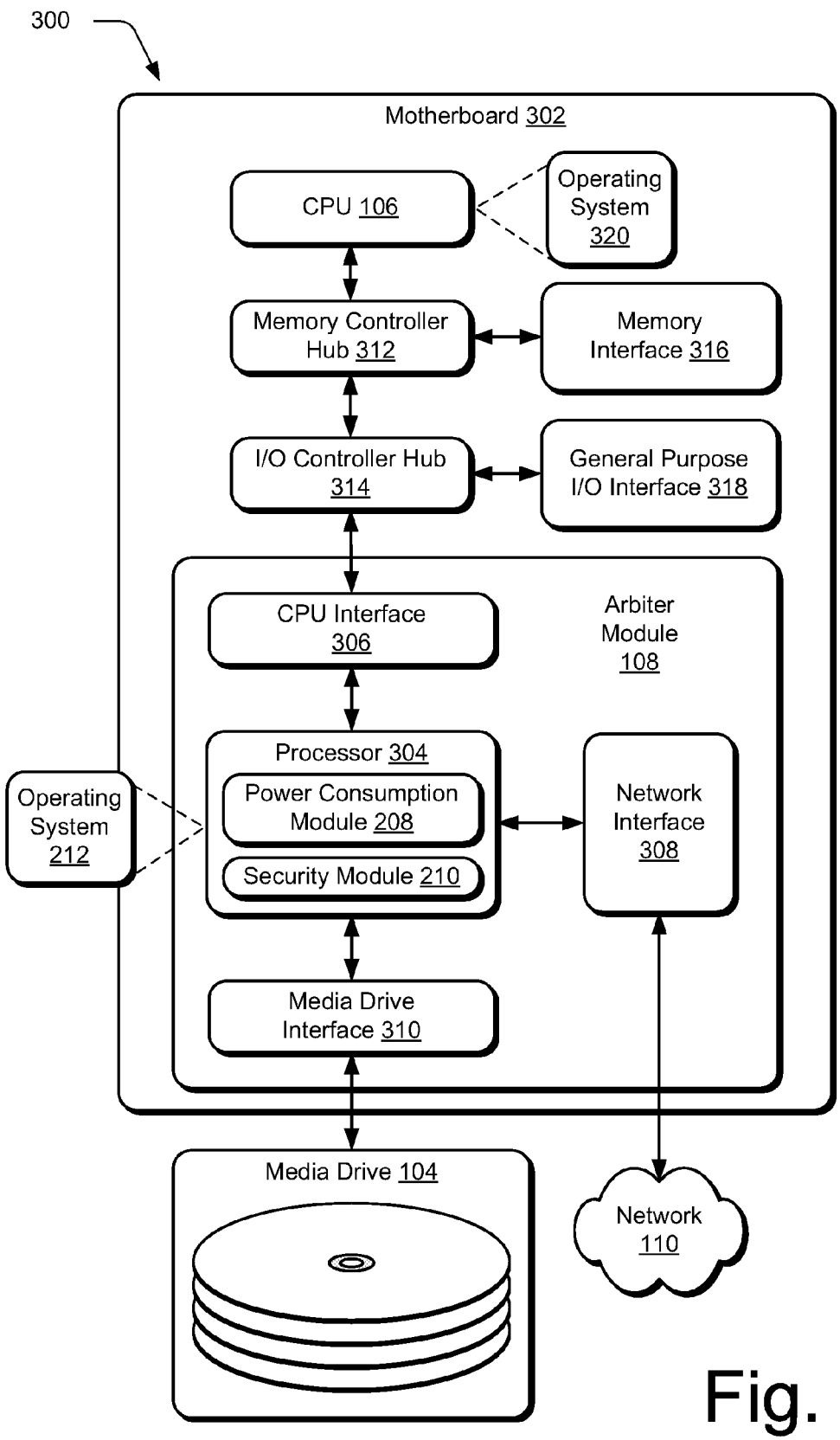
FIG. 3 is an illustration of a system in an example implementation in which the arbiter module of FIGS. 1 and 2 is shown as being implemented with a central processing unit on a motherboard.

FIG. 3 depicts a system 300 in an example implementation in which the arbiter module 108 of FIGS. 1 and 2 is shown as being implemented with the CPU 106 on a motherboard 302. The arbiter module 108 may be implemented in a variety of ways, such as a "system on a chip" (SOC), a chipset, and so on. The arbiter module 108 is illustrated as including a processor 304 and a plurality of interfaces (which may be implemented via one or more modules), examples of which are illustrated as a CPU interface 306, a network interface 308 and a media drive interface 310.

The network interface 308 is representative of functionality of the arbiter module 108 to connect to the network 110. For example, the network interface 308 may be configured to connect to a network connection device that is configured to send and receive data via a network 110. In another example, the network interface 308 may be configured to include the functionality of the network connection device itself. A variety of other examples are also contemplated.

Likewise, the media drive interface 310 is representative of functionality of the arbiter module 108 to connect to the media drive 104. Thus, the media drive interface 310 may be configured to include functionality to connect directly with the media drive 104, indirectly through one or more other devices (e.g., via a Universal Serial Bus), and so on.

The CPU interface 306 is illustrated as being communicatively coupled to the CPU 106 via a memory controller 312 (which is also known as a "Northbridge") and an input-output (I/O) controller hub 314 (which is also known as a "Southbridge"). As illustrated in FIG. 3, the CPU interface 306 is communicatively coupled to the I/O controller hub 314, which is communicatively coupled to the memory controller hub 312, which is communicatively coupled to the CPU 106.

Memory controller hub 312 is illustrated as being communicatively coupled to a memory interface 316. The memory interface 316 may be configured to communicatively couple the CPU 106 through the memory controller hub 312 to memory, which may store data to be processed by the CPU 106. Additionally, the memory controller hub 312 may provide a variety of other functionality, such as to communicatively couple a "high speed" graphics card to the CPU 106. Thus, the memory controller hub 312 is typically utilized for "fast" capabilities of the computer 102 of FIG. 1.

The I/O controller hub 314 is illustrated as being communicatively coupled to a general-purpose I/O interface 318. The I/O controller hub 314 may be utilized to implement "slower" capabilities of the computer 102 of FIG. 1. For example, the general-purpose input-output interface 318 may be utilized to connect devices to the CPU 106 via a PCI bus; provide a communicative coupling to a BIOS, a serial port, a parallel port, one or more peripheral devices; input/output devices (e.g., keyboard, mouse); and so on. Thus, in this example the motherboard 302 follows a "Northbridge/Southbridge" CPU architecture.

The arbiter module 108 is illustrated in FIG. 3 as being implemented by a processor 304, with the power consumption module 208 and the security module 210 representing software (e.g., executable modules) that are executable on the processor 304. The arbiter module 108, as previously described, represents functionality to manage routing of data between the media drive 104, the network 110 and the CPU 106.

Traditionally, routing between the network 110 and the media drive 104 was performed by the CPU 106 in combination with the I/O controller hub 314. Consequently, the CPU 106 and the I/O controller hub 314 (and the memory controller hub 312 that communicatively couples the I/O controller hub 314 to the CPU 106) were active to perform this communication.

However, by providing this functionality by the arbiter module 108 independent of one or more other devices of the computer 102 (e.g., the CPU 106, the memory controller hub 312 and the I/O controller hub 314,) these other devices may be placed in the sleep state to conserve power. Additionally, the security module 210 may provide virus scanning and other security techniques that may be used to protect the computer 102 of FIG. 1 from attack by malicious parties. Further discussion of these techniques may be found in relation to the example procedures.

Generally, any of the functions described herein can be implemented using software, firmware (e.g., fixed logic circuitry), manual processing, or a combination of these implementations. The terms "module" and "functionality" as used herein generally represent software, firmware, hardware or a combination thereof. In the case of a software implementation, the module, functionality, or logic represents program code that performs specified tasks when executed on one or more CPUs, e.g., processors. The program code can be stored in one or more computer readable memory devices. The arbiter module features described herein are platform-independent, meaning that the techniques may be implemented on a variety of commercial computing platforms having a variety of processors.

Example Procedure

Figure 4:
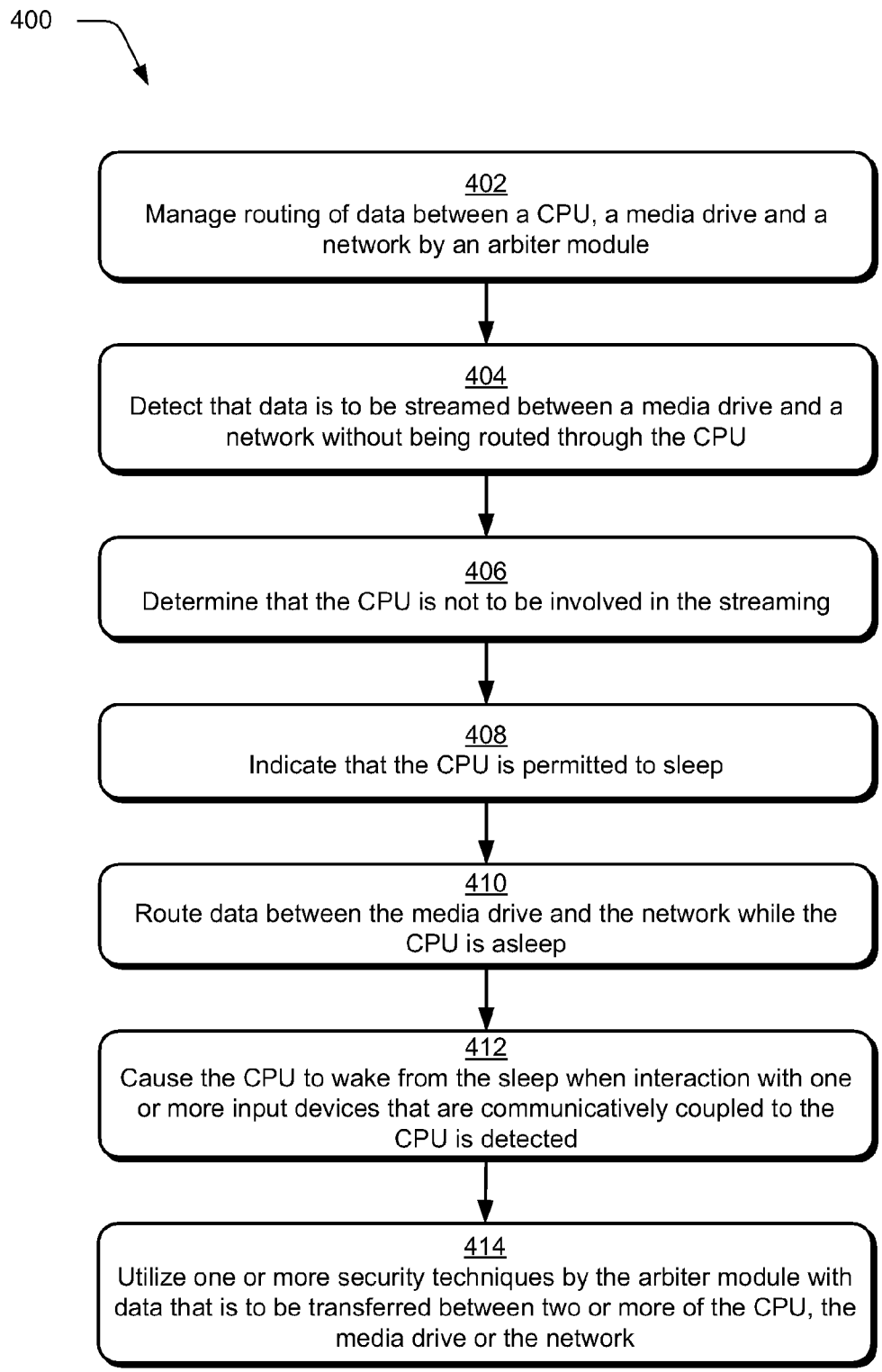
FIG. 4 is a flow diagram that depicts a procedure in an example implementation in which routing of data between a network and a media drive is managed by an arbiter module.

FIG. 4 depicts a procedure 400 in an example implementation in which routing of data between a network and a media drive is managed by an arbiter module. The following discussion may be implemented utilizing the previously described systems and devices, as well as other systems and devices subsequently described. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks.

Routing of data between a CPU, a media drive and a network is managed by an arbiter module (block 402). The arbiter module 108, for instance, may be positioned on a motherboard 302 with the CPU 106 and be responsible for routing of data between the CPU 106, the media drive 104, and the network 110, one to another.

Data is detected that is to be streamed between a media drive in a network without being routed through the CPU (block 404). The arbiter module 108, for example, may detect that a particular stream of the data is to be communicated between the media drive 104 and the network 110. For instance, the stream may be involved in an upload of data from the media drive 104 through the arbiter module 108 to the network 110. In another instance the stream may be involved in a download of the data via the network 102 to be stored on the media drive 104. In each of these instances, however, a determination is made that the CPU is not to be involved in streaming (block 406).

Accordingly, an indication may be provided to the CPU that indicates that the CPU is permitted to sleep (block 408). For instance, the arbiter module 108 may provide a command to the CPU 106, which indicates that the CPU 106 (and other devices communicatively coupled to the CPU 106) is permitted to sleep. Therefore, the CPU 106 may make a determination of whether to enter a sleep state based on whether other data is to be processed by the CPU 106, such as by another application, the application that requested the upload and/or download, and so on.

Accordingly, data may be routed between the media drive and the network while the CPU is asleep (block 410). When interaction with one or more input devices that are communicatively coupled to the CPU is detected, the CPU may be caused to wake from the sleep (block 412). In this way, power may be conserved by the arbiter module 108 as previously described in relation to FIG. 2 yet the CPU 106 is still available to perform desired functions.

One or more security techniques may also be utilized by an arbiter module with data that is to be transferred between two or more of the CPU, the media drive or the network (block 414). For example, the arbiter module 108 may utilize a security module 210 to perform a virus scan of data that is to be transferred between the CPU 106, the media drive 104 and/or the network 110. Thus, in this example the virus may be prevented from communication "past" the arbiter module 108 to other devices. In another example, the arbiter module 108 may execute a dedicated operation system 212 that is different from an operating system 320 executed on the central processing unit 106. Thus, the operating system 212 executed on the arbiter module 108 does not share vulnerabilities that may be present on the operating system executed on the central processing unit 106. A variety of other examples are also contemplated. These techniques may also be applied to a wide variety of other devices, examples of which may be found in relation to the following figures.

FIGS. 5-12 illustrate some examples of various devices that can each be implemented as any form of a device to implement various embodiments of the previously described arbitration techniques. For example, any of the various devices can be implemented as a device that is used to employ arbitration, e.g., a media drive, a computer, and so on. All or a part of these techniques may be employed within signal processing and/or control functionality of the devices, examples of which are as follows.

Figure 5:
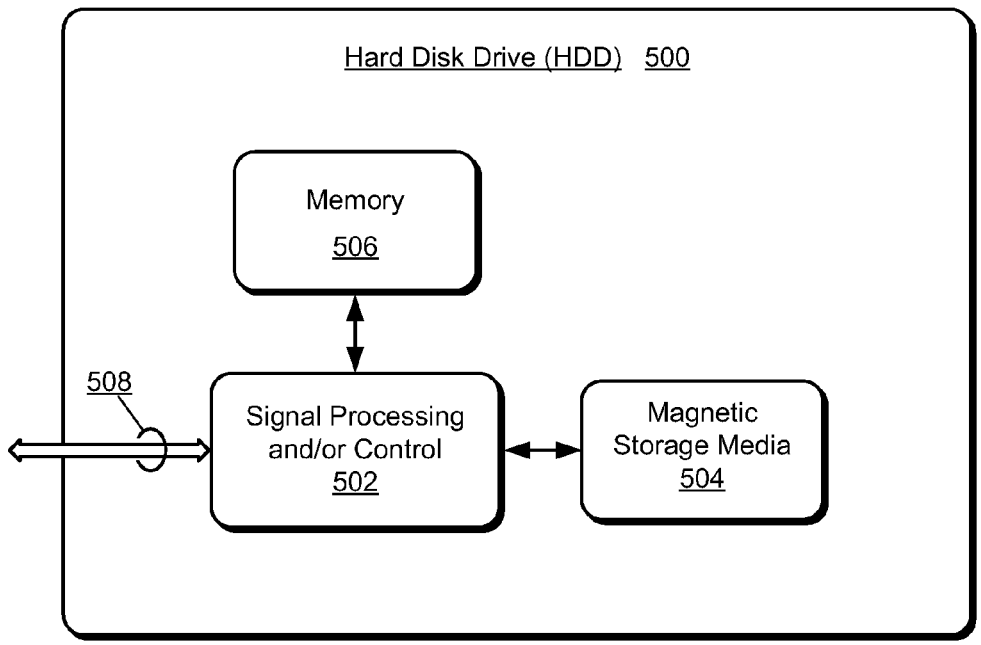
FIGS. 5-12 illustrate some examples of various devices that can each be implemented as a device that employs re-encryption techniques.

FIG. 5 illustrates an example media drive that may be embodied as a hard disk drive (HDD) 500, which includes signal processing and/or control circuit(s) generally identified at 502. The HDD 500 can also include a magnetic storage media 504 and/or a memory 506, such as random access memory (RAM), a low-latency nonvolatile memory such as flash memory, read only memory (ROM), and/or other suitable electronic data storage. In various implementations, the signal processing and/or control circuit(s) 502 can be implemented to process data (e.g., any of encoding, decoding, encryption, and/or decryption), perform data calculations, and/or format data. The data can be output to and/or received from at least the magnetic storage media 504 and/or the memory 506. In addition, the HDD 500 can communicate with a host device (not shown) such as a computer or mobile computing devices, such as a personal digital assistant, cellular phone, media or MP3 player, and/or other devices via one or more wired or wireless communication links 508. Data communicated by the device may leverage the previously described arbitration techniques as represented by the signal processing and/or control 502.

Figure 6:
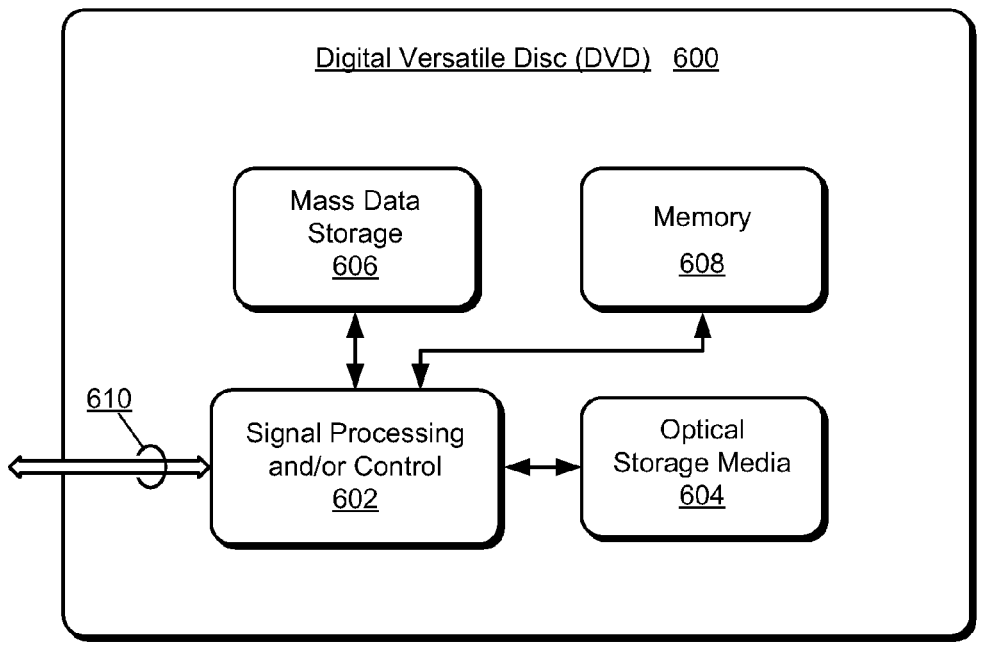

FIG. 6 illustrates an example media drive that may be embodied as a digital versatile disc (DVD) drive 600, which includes signal processing and/or control circuit(s) generally identified at 602. The DVD drive 600 can also include an optical storage media 604, mass data storage 606, and/or a memory 608, such as random access memory (RAM), a low-latency nonvolatile memory such as flash memory, read only memory (ROM), and/or other suitable electronic data storage. The mass data storage 606 can store data in a nonvolatile manner, and may include a hard disk drive (HDD) such as described with reference to FIG. 5, which may be a mini HDD that includes one or more platters having a diameter that is smaller than approximately 1.8 inches.

In various implementations, the signal processing and/or control circuit(s) 602 can be implemented to process data (e.g., any of encoding, decoding, encryption, and/or decryption), perform data calculations, format data, and/or any other signal processing functions associated with a DVD drive. The data can be written to and/or read from at least the optical storage media 604 and/or the memory 608. In addition, the DVD drive 600 can communicate with an output device (not shown) such as a computer, television, and/or other devices via one or more wired or wireless communication links 610. Data communicated by the device may leverage the previously described arbitration techniques as represented by the signal processing and/or control 602.

Figure 7:
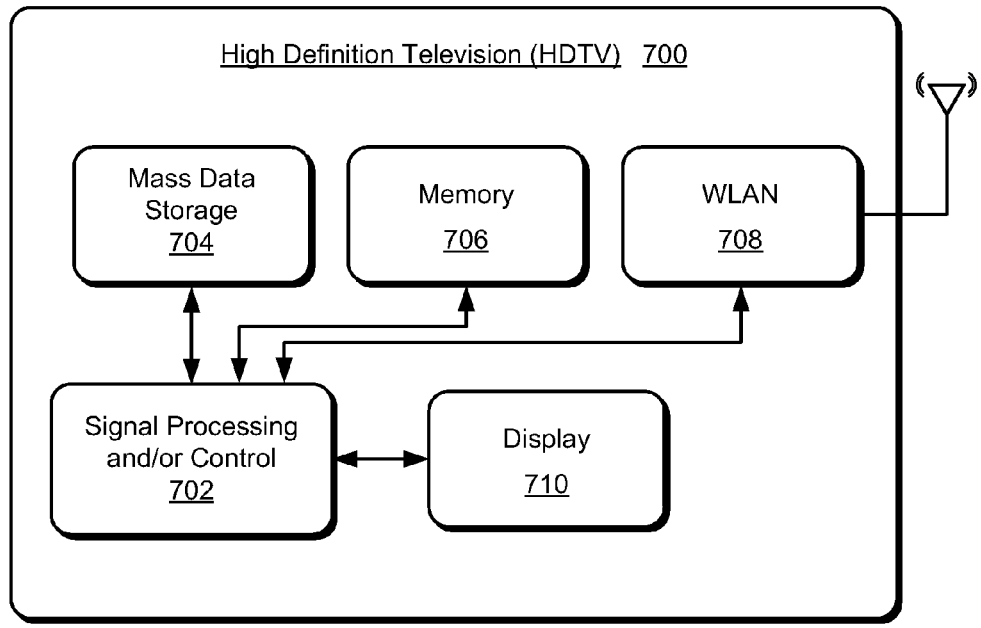

FIG. 7 illustrates an example computer that may be embodied as a high definition television (HDTV) 700, which includes signal processing and/or control circuit(s) generally identified at 702. The HDTV 700 can also include mass data storage 704 and/or a memory 706, such as random access memory (RAM), a low-latency nonvolatile memory such as flash memory, read only memory (ROM), and/or other suitable electronic data storage. The mass data storage 704 can store data in a nonvolatile manner, and may include an optical storage media as described with reference to FIG. 6, and/or a drive as described with reference to FIG. 5, which may be a mini HDD that includes one or more platters having a diameter that is smaller than approximately 1.8 inches.

In various implementations, the signal processing and/or control circuit(s) 702 can be implemented to process data (e.g., any of encoding, decoding, encryption, and/or decryption), perform data calculations, format data, and/or any other signal processing functions associated with an HDTV. The data can be output to and/or received from at least the memory 706. In addition, the HDTV 700 includes a wireless local area network (WLAN) interface 708 via which input signals can be received in either a wired or wireless format. HDTV output signals can be generated for a display 710. Data communicated by the device, whether internally or externally, may leverage the previously described arbitration techniques as represented by the signal processing and/or control 702.

Figure 8:
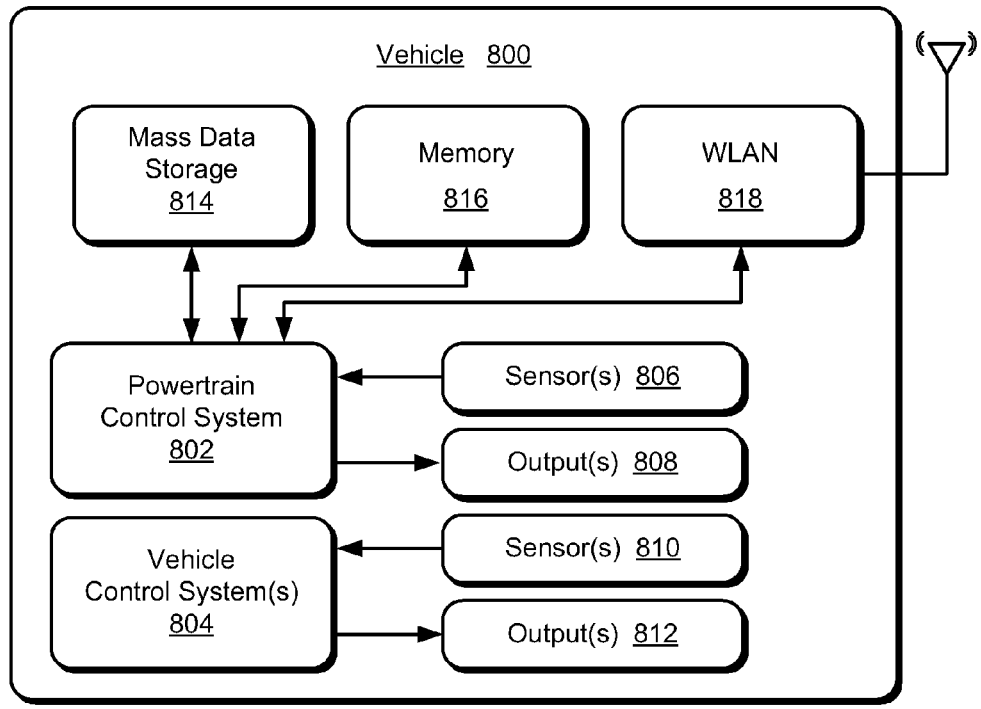

FIG. 8 illustrates an example computer that may be embodied as a part of a vehicle 800, which includes a powertrain control system 802 and, optionally, additional vehicle control system(s) 804. The powertrain control system 802 can receive data inputs from one or more sensors 806 such as temperature sensors, pressure sensors, rotational sensors, airflow sensors, and/or any other suitable sensors. The powertrain control system 802 can receive the data inputs and generate one or more output control signals 808, such as engine operating parameters, transmission operating parameters, braking parameters, and/or other control signals.

Additional control system(s) 804 may likewise receive data signals from one or more input sensors 810 and/or generate output control signals 812 to one or more output devices. In various implementations, a control system 804 may be part of an anti-lock braking system (ABS), a navigation system, a telematics system, a vehicle telematics system, a lane departure system, an adaptive cruise control system, and/or a vehicle entertainment system such as a stereo, DVD, compact disc, and the like.

The vehicle 800 can also include mass data storage 814 and/or a memory 816, such as random access memory (RAM), a low-latency nonvolatile memory such as flash memory, read only memory (ROM), and/or other suitable electronic data storage. The mass data storage 814 can store data in a nonvolatile manner, and may include an optical storage media as described with reference to FIG. 6, and/or a drive as described with reference to FIG. 5, which may be a mini HDD that includes one or more platters having a diameter that is smaller than approximately 1.8 inches. In addition, vehicle 800 includes a wireless local area network (WLAN) interface 818 via which input signals can be received in either a wired or wireless format. The powertrain control system 802 also may support connections with a WLAN via the WLAN interface 818. Data communicated by the device, whether internally or externally, may leverage the previously described arbitration techniques as represented by the powertrain control system 802 and/or the vehicle control system 804.

Figure 9:
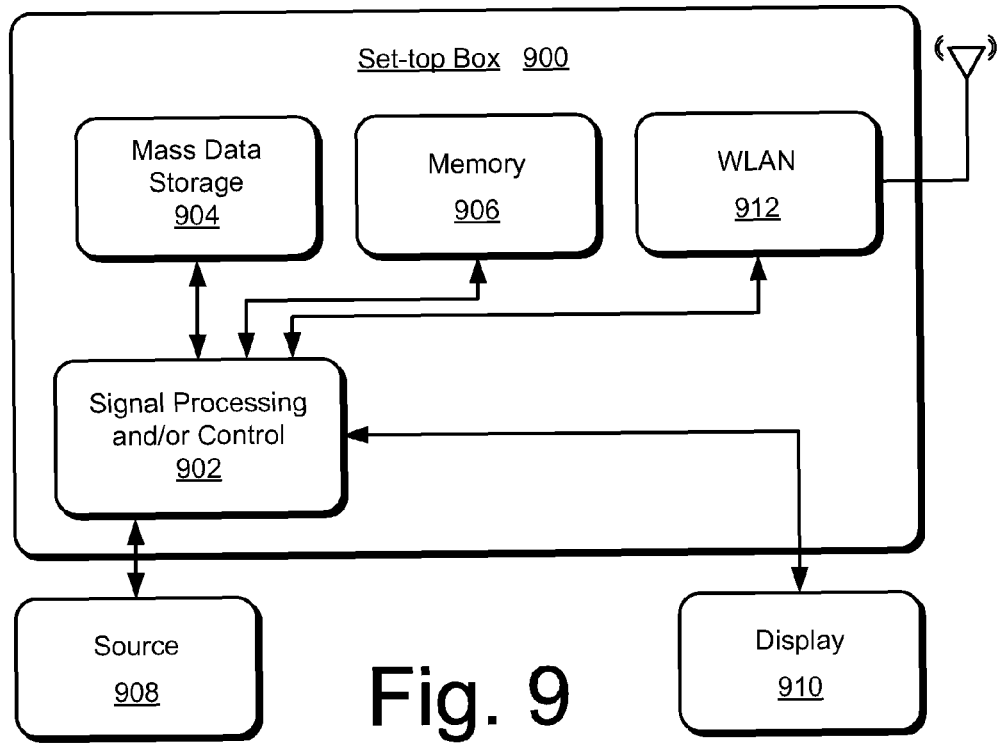

FIG. 9 illustrates an example computer that may be embodied as a television set-top box 900, which includes signal processing and/or control circuit(s) generally identified at 902. The set-top box 900 can also include mass data storage 904 and/or a memory 906, such as random access memory (RAM), a low-latency nonvolatile memory such as flash memory, read only memory (ROM), and/or other suitable electronic data storage. The mass data storage 904 can store data in a nonvolatile manner, and may include an optical storage media as described with reference to FIG. 6, and/or a drive as described with reference to FIG. 5, which may be a mini HDD that includes one or more platters having a diameter that is smaller than approximately 1.8 inches.

The set top box 900 can receive data signals from a source 908, such as a broadband source, and can then output standard and/or high definition audio/video signals suitable for a display 910, such as a television, monitor, and/or other video and/or audio output devices. In various implementations, the signal processing and/or control circuit(s) 902 can be implemented to process data (e.g., any of encoding, decoding, encryption, and/or decryption), perform data calculations, format data, and/or any other signal processing functions associated with a television set-top box. The data can be output to and/or received from at least the memory 906 and/or the source 908. In addition, the set-top box 900 includes a wireless local area network (WLAN) interface 912 via which input signals can be received in either a wired or wireless format. The set-top box 900 may also support connections with a WLAN via the WLAN interface 912. Data communicated by the device, whether internally or externally, may leverage the previously described arbitration techniques as represented by the signal processing and/or control 902.

Figure 10:
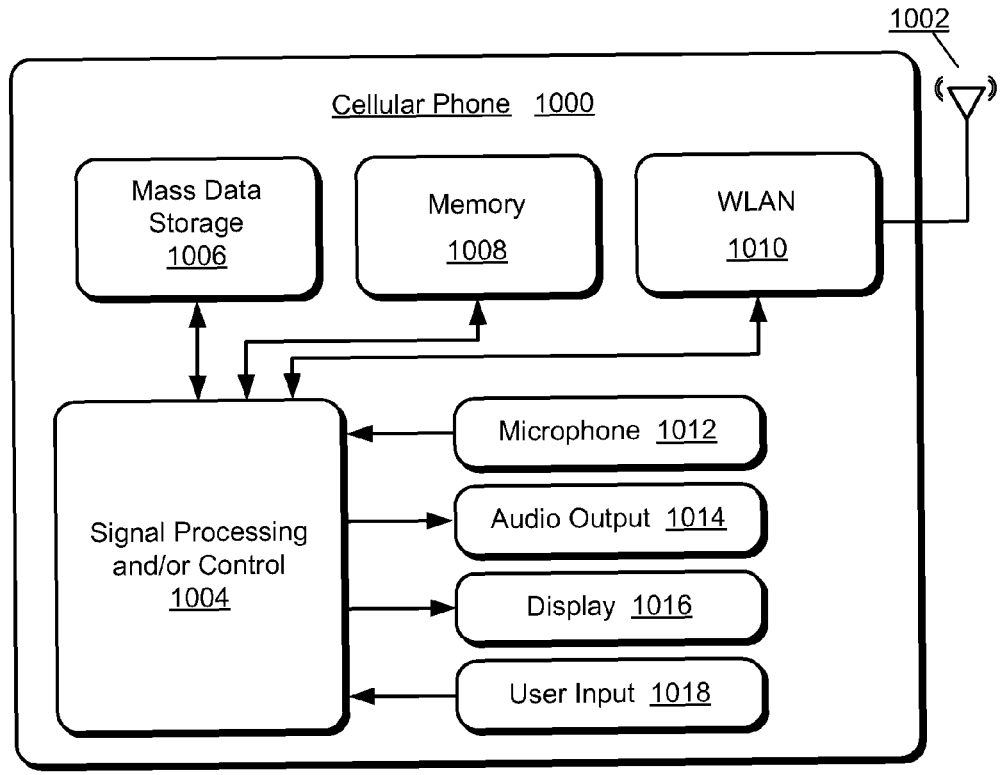

FIG. 10 illustrates an example computer that may be embodied as a cellular phone 1000, which includes a cellular antenna 1002 and signal processing and/or control circuit(s) generally identified at 1004. The cellular phone 1000 can also include mass data storage 1006 and/or a memory 1008, such as random access memory (RAM), a low-latency nonvolatile memory such as flash memory, read only memory (ROM), and/or other suitable electronic data storage. The mass data storage 1006 can store data in a nonvolatile manner, and may include an optical storage media as described with reference to FIG. 6, and/or a drive as described with reference to FIG. 5, which may be a mini HDD that includes one or more platters having a diameter that is smaller than approximately 1.8 inches.

In various implementations, the signal processing and/or control circuit(s) 1004 can be implemented to process data (e.g., any of encoding, decoding, encryption, and/or decryption), perform data calculations, format data, and/or any other signal processing functions associated with a cellular phone. The data can be output to and/or received from at least the memory 1008. In addition, the cellular phone 1000 includes a wireless local area network (WLAN) interface 1010 via which input signals can be received in a wireless format. The cellular phone 1000 may also support connections with a WLAN via the WLAN interface 1010. In some implementations, the cellular phone 1000 can include a microphone 1012, an audio output 1014 such as a speaker and/or audio output jack, a display 1016, and/or an input device 1018 such as a keypad, pointing device, voice actuation, and/or other input device. Data communicated by the device, whether internally or externally, may leverage the previously described arbitration techniques as represented by the signal processing and/or control 1004.

Figure 11:
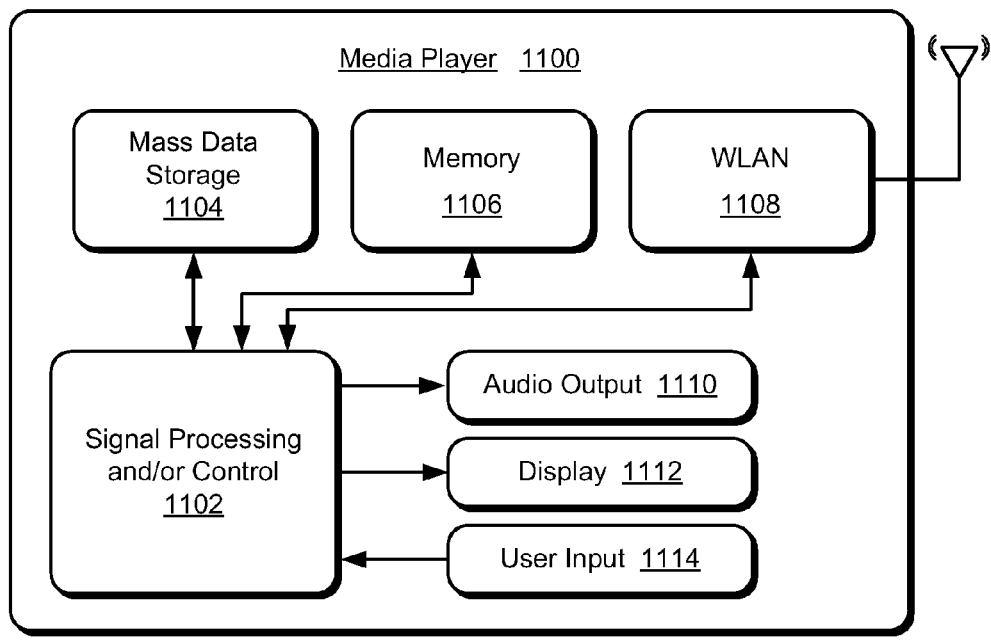

FIG. 11 illustrates an example computer that may be embodied as a media player 1100, which includes signal processing and/or control circuit(s) generally identified at 1102. The media player 1100 can also include mass data storage 1104 and/or a memory 1106, such as random access memory (RAM), a low-latency nonvolatile memory such as flash memory, read only memory (ROM), and/or other suitable electronic data storage. The mass data storage 1104 can store data, such as compressed audio and/or video content, in a nonvolatile manner. In some implementations, compressed audio files include files that are compliant with an MP3 format or other suitable compressed audio and/or video formats. The mass data storage 1104 may include an optical storage media as described with reference to FIG. 6, and/or a drive as described with reference to FIG. 5, which may be a mini HDD that includes one or more platters having a diameter that is smaller than approximately 1.8 inches.

In various implementations, the signal processing and/or control circuit(s) 1102 can be implemented to process data (e.g., any of encoding, decoding, encryption, and/or decryption), perform data calculations, format data, and/or any other signal processing functions associated with a media player. The data can be output to and/or received from at least the memory 1106. In addition, the media player 1100 includes a wireless local area network (WLAN) interface 1108 via which input signals can be received in either a wired or wireless format. The media player 1100 may also support connections with a WLAN via the WLAN interface 1108. In some implementations, the media player 1100 can include an audio output 1110 such as a speaker and/or audio output jack, a display 1112, and/or an input device 1114 such as a keypad, touchpad, pointing device, voice actuation, and/or other input device. In various implementations, media player 1100 may employ a graphical user interface (GUI) that typically includes menus, drop down menus, icons, and/or a point-and-click interface via display 1112 and/or user input 1114. Data communicated by the device, whether internally or externally, may leverage the previously described arbitration techniques as represented by the signal processing and/or control 1102.

Figure 12:
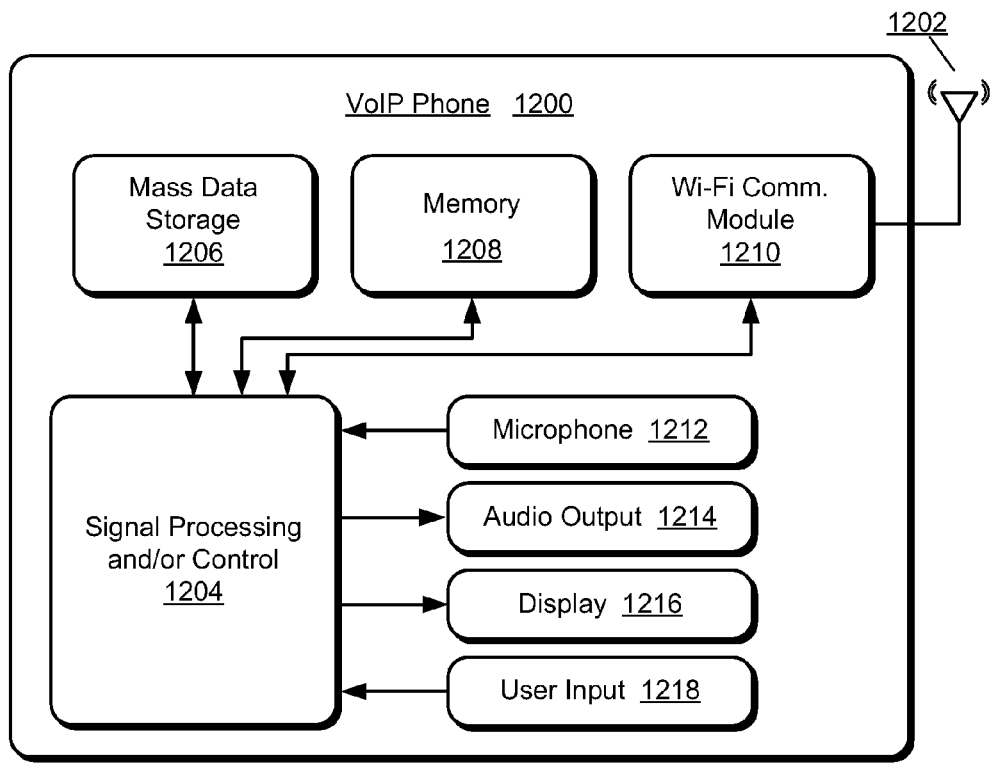

FIG. 12 illustrates an example computer that may be embodied as a Voice over Internet Protocol (VoIP) phone 1200, which includes an antenna 1202 and/or is implemented in connection with a VoIP box that enables a conventional telephone to be plugged in and utilized with VoIP technology. The VoIP phone 1200 also includes signal processing and/or control circuit(s) generally identified at 1204. The VoIP phone 1200 can also include mass data storage 1206 and/or a memory 1208, such as random access memory (RAM), a low-latency nonvolatile memory such as flash memory, read only memory (ROM), and/or other suitable electronic data storage. The mass data storage 1206 can store data in a non-volatile manner, and may include an optical storage media as described with reference to FIG. 6, and/or a drive as described with reference to FIG. 5, which may be a mini HDD that includes one or more platters having a diameter that is smaller than approximately 1.8 inches.

In various implementations, the signal processing and/or control circuit(s) 1204 can be implemented to process data (e.g., any of encoding, decoding, encryption, and/or decryption), perform data calculations, format data, and/or any other signal processing functions associated with a VoIP phone. The data can be output to and/or received from at least the memory 1208. In addition, the VoIP phone 1200 includes a Wireless Fidelity (Wi-Fi) communication module 1210 via which communication links with a VoIP network can be established. In some implementations, the VoIP phone 1200 can include a microphone 1212, an audio output 1214 such as a speaker and/or audio output jack, a display 1216, and/or an input device 1218 such as a keypad, pointing device, voice actuation, and/or other input device. Data communicated by the device, whether internally or externally, may leverage the previously described arbitration techniques as represented by the signal processing and/or control 1204.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus comprising:
   a plurality of interfaces to provide a communicative coupling between a central processing unit, a media drive, and a network interface of a computing device; and
   one or more modules to manage data routing between each of the plurality of interfaces such that a stream of data is routable between the media drive and the network interface independent of both the central processing unit and software associated with the central processing unit, the one or more modules including another processor of the computing device and an operating system executable on the other processor to:
   determine that a particular stream of the data is routable without involvement of the central processing unit of the computing device;
   route the particular stream of the data between the media drive and the network interface; and
   indicate that the central processing unit is permitted to enter a low-power state while at least a portion of the particular stream of the data is routed.

2. The apparatus as described in claim 1, wherein to indicate that the central processing unit is permitted to enter the low-power state includes providing a command to the central processing unit that indicates entry into the low-power state is permitted.

3. The apparatus as described in claim 1, wherein the one or more modules indicate that the central processing unit is permitted to enter the low-power state in response to determining the particular stream of data is routable without involvement of the central processing unit.

4. The apparatus as described in claim 1, wherein the one or more modules are configured as an input/output (I/O) hub or I/O bridge of the computing device operably coupled with the central processing unit via a main system bus and providing the central processing unit with connectivity to the media drive and the network interface.

5. The apparatus as described in claim 1, wherein the one or more modules are configured to enable the central processing unit to exit the low-power state responsive to interaction with an input device communicatively coupled to the computing device.

6. The apparatus as described in claim 1, wherein the data is routable between:
   the central processing unit and the media drive; and
   the central processing unit and the network interface.

7. The apparatus as described in claim 1, wherein the plurality of interfaces and the one or more modules are formed on a single integrated circuit.

8. The apparatus as described in claim 1, wherein:
   the central processing unit is connectable to the one of more modules via at least one of the plurality of interfaces; and
   the at least one of the plurality of interfaces provides a communicative coupling to an input/output controller hub that is communicatively coupled to a memory controller hub that is communicatively coupled to the central processing unit.

9. The apparatus as described in claim 1, wherein each of the one or more modules is configured to consume at least an order of magnitude less power than the central processing unit when the central processing unit is in an active state.

10. The apparatus as described in claim 1, wherein the operating system does not share vulnerabilities of another operating system executed on the central processing unit of the computing device.

11. The apparatus as described in claim 10, wherein the operating system causes the other processor to manage the data routing to provide virus protection by examining the data that is to be communicated to the central processing unit for viruses before the data is communicated to the central processing unit.

12. The apparatus as described in claim 10, wherein the operating system causes the other processor to manage the data routing to provide virus protection by examining the data that is to be communicated to the media drive for viruses before the data is communicated to the media drive.

13. The apparatus as described in claim 1, wherein the one or more modules include a media drive interface configured to route data to the media drive independent of a memory controller associated with the central processing unit.

14. The apparatus as described in claim 1, wherein:
   the media drive is a hard disk drive; and
   the network is a packet-switched network.

15. A method comprising:
   detecting, by an arbiter module of a computing device, that a particular stream of data is routable between a network interface and a media drive of the computing device without being routed through a central processing unit of the computing device, the arbiter module including a processor and software that is executable on the processor to perform routing of data between the network interface and the media drive independent of both the central processing unit and software associated with the central processing unit;
   indicating that the central processing unit is permitted to sleep while at least a portion of the particular stream of data is routed; and
   routing at least a portion of the particular stream of data between the network interface and the media drive while the central processing unit sleeps.

16. The method as described in claim 15, wherein the arbiter module is communicatively coupled to an input/output controller hub that is communicatively coupled to a memory controller hub that is communicatively coupled to the central processing unit.

17. The method as described in claim 15, wherein the software includes an operating system associated with the arbiter module.

18. The method as described in claim 15, further comprising causing the central processing unit to wake when interaction with one or more input devices communicatively coupled to the central processing unit is detected.

19. The method as described in claim 15, wherein the routing is performed such that the media drive stores the particular stream of data received from the network interface.

20. The method as described in claim 15, wherein the routing is performed such that the network interface communicates the particular stream of data received from the media drive.

21. A system comprising:
a central processing unit;
software, including an operating system, associated with the central processing unit;
a media drive configured to store data;
a network interface configured to communicate data over a network; and
means for managing routing of streams of data between each of a plurality of interfaces such that a particular stream of data is routable between the media drive connected to one of the plurality of interfaces and the network interface connected to another one of the plurality of interfaces independent of both the central processing unit and the software associated with the central processing unit, the managing means including processing means for executing another operating system configured to:
 determine that the particular stream of the data is routable independent of the central processing unit;
 route the particular stream of the data between the media drive and the network interface; and
 indicate that the central processing unit is permitted to enter a low-power state while at least a portion of the particular stream of the data is routed.

22. A system as described in claim 21, wherein:
the managing means includes a means for security; and
the security means is configured to detect a virus in the data before communication of the data to the central processing unit.

23. A system as described in claim 22, wherein the means for security does not share vulnerabilities of the software associated with the central processing unit.

24. A system as described in claim 21, wherein the system is employed as part of a motherboard of a computer.

25. A system as described in claim 21, wherein the network is a packet-switched network.

* * * * *